United States Patent
Ciochina et al.

(10) Patent No.: US 12,156,150 B2
(45) Date of Patent: Nov. 26, 2024

(54) SIGNALING METHOD FOR D2D SYNCHRONIZATION

(71) Applicant: MITSUBISHI ELECTRIC CORPORATION, Tokyo (JP)

(72) Inventors: Cristina Ciochina, Rennes (FR); Nicolas Gresset, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 528 days.

(21) Appl. No.: 17/431,994

(22) PCT Filed: Feb. 18, 2020

(86) PCT No.: PCT/JP2020/007276
§ 371 (c)(1),
(2) Date: Aug. 18, 2021

(87) PCT Pub. No.: WO2020/202895
PCT Pub. Date: Oct. 8, 2020

(65) Prior Publication Data
US 2021/0385769 A1    Dec. 9, 2021

(30) Foreign Application Priority Data
Mar. 29, 2019  (EP) .................... 19305428

(51) Int. Cl.
*H04W 56/00*   (2009.01)
*H04W 92/18*   (2009.01)

(52) U.S. Cl.
CPC ....... *H04W 56/001* (2013.01); *H04W 56/004* (2013.01); *H04W 92/18* (2013.01)

(58) Field of Classification Search
CPC ............ H04W 56/001; H04W 56/004
(Continued)

(56) References Cited

U.S. PATENT DOCUMENTS

2016/0044618 A1* 2/2016 Sheng ............... H04W 56/001
                                                                370/329
2016/0337992 A1* 11/2016 Sheu ................ H04W 56/001
(Continued)

FOREIGN PATENT DOCUMENTS

| EP | 3 448 097 A1 | 2/2019 |
| JP | 2017-515431 A | 6/2017 |
| JP | 2018-36995 A | 3/2019 |

OTHER PUBLICATIONS

Japanese Office Action for Japanese Application No. 2021-562442, dated Jul. 26, 2022, with English translation.
(Continued)

*Primary Examiner* — Faisal Choudhury
(74) *Attorney, Agent, or Firm* — Birch, Stewart, Kolasch & Birch, LLP (57) ABSTRACT

Method implemented by a device for receiving synchronization data in a device-to-device communication system, said method comprising: receiving a first synchronization signal and a first information associated to a first initial synchronization source, such as the first synchronization signal is either an initial synchronization signal emitted by the first initial synchronization source or a synchronization signal emitted by another device which is synchronized based on the first initial synchronization sources; receiving a second synchronization signal and a second information associated to a second initial synchronization source, such as the second synchronization signal is either an initial synchronization signal emitted by the second initial synchronization source or a synchronization signal emitted by another device which is synchronized based on the second initial synchronization sources.

19 Claims, 6 Drawing Sheets

(58) Field of Classification Search
USPC .......................................................... 370/503
See application file for complete search history.

(56) References Cited

U.S. PATENT DOCUMENTS

2017/0331620 A1    11/2017  Tsai et al.
2018/0352525 A1*   12/2018  Li ...................... H04W 56/004

OTHER PUBLICATIONS

Japanese Office Action for Japanese Application No. 2021-562442, dated Dec. 6, 2022, with English translation.
"3rd Generation Partnership Project; Technical Specification Group Radio Access Network; Study on LTE-based V2X Services; (Release 14)", 3GPP TR 36.885 V0.3.0, Nov. 21, 2015, total 59 pages.

* cited by examiner

SIGNALING METHOD FOR D2D SYNCHRONIZATION

TECHNICAL FIELD

The present invention generally relates to the domain of device-to-device telecommunication system, and more specifically to the synchronization of the devices in such telecommunication system.

BACKGROUND ART

To perform sidelink (device-to-device) communication between two devices of a D2D telecommunication system requires these devices to be synchronized, if not the device will not be able to decode the received message.

LTE or NR provides standards specific to D2D communication LTE V2X and NR V2X. These standards plan that synchronization in device-to-device telecommunication system can be performed based either on signals transmitted by a base station, or by a Global Navigation Satellite System (GNSS) or by other devices. When synchronization is performed based on signals received from a base station, synchronization signals composed of primary synchronization signal PSS and secondary synchronization signal SSS are sent in specific part of certain frames by the base station. The device which performs synchronization uses the autocorrelation properties of these synchronization signals to detect them. Once detected, information on the position in the frame of these signals enables to synchronize to the base station. When the synchronization is performed based on signals transmitted by a device, said device may also emit synchronization signals composed of primary synchronization signal PSS and secondary sidelink synchronization signal SSSS in a specific part of certain frames. The device which preforms synchronization uses the autocorrelation properties of these synchronization signals to detect them. Once detected, information on the position in the frame (e.g., in a MIB in the PSBCH) of these signals enables to synchronize this device to the device which emitted the synchronization signals.

By frame we understand a timing unit, which may denote in different standards for example a frame, a subframe, a slot or other timing unit at the beginning of which communication may begin.

When the device receives synchronization signals from more than one source rules have been set to decide to which source the device will synchronize. Those rules define priorities regarding the synchronization sources. Therefore, when synchronization signals are detected from two different synchronization sources the device will synchronize according to the source with the highest priority level. The highest priority level is usually affected either to the base stations or to the GNSSs, these synchronization sources may be referred to as primary sources. Lower priority levels are usually affected to devices acting as a synchronization source when the device is either under coverage of a base station or synchronized based on a primary source through one or several hops of devices. The synchronization sources with the lowest priority level are the devices acting alone as synchronization source, that is, that are not synchronized to an initial synchronization source either directly or by the intermediate of other devices (that is, that are not relaying the timing from an initial synchronization sources acquired either directly or by the intermediate of other devices). In case signals from several synchronization sources with the same level of priority are detected, the device will synchronize to the source with the strongest received signal.

By synchronization of the device it is understood time and frequency synchronization.

However, these rules, in some circumstances, are inadequate and may lead to loss of synchronization and thus loss of communication with a near device or may also lead to the impossibility for the device to synchronize with a near device. Several examples of such situation are hereafter explained.

Figure 1:
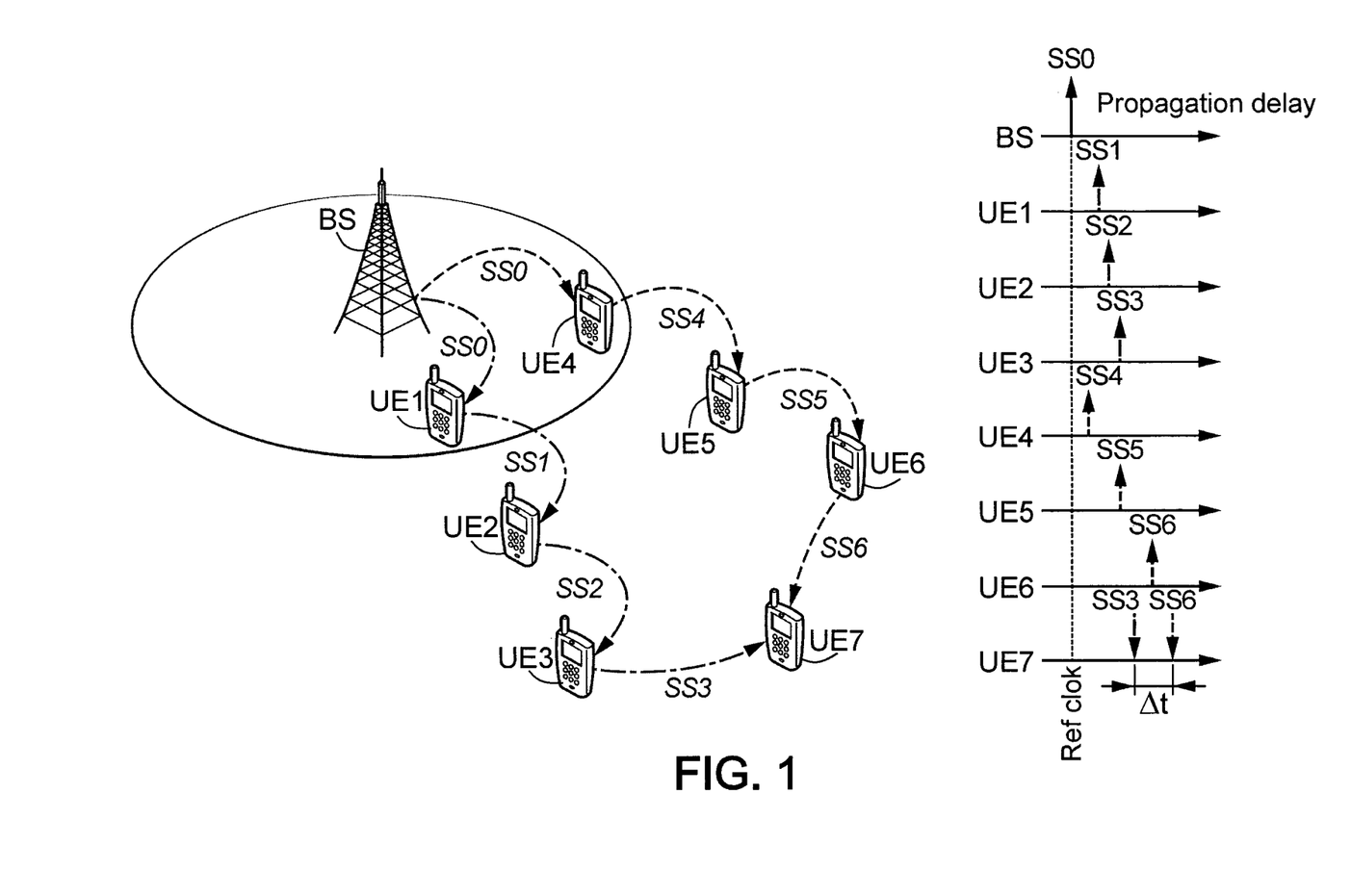
FIG. 1 illustrates two clusters of UEs and a base station according to the invention.

In the example of FIG. 1 two user equipment (UE1, UE4) are both synchronized with the same base station (BS) which emits a synchronization signal based on an internal reference clock (referred as Ref Clock). Due to propagation delays, which are potentially different due to differences in the relative distance to the base station of each UE, UE1 and UE4 detect at later different moments in time the synchronization signal SS0 emitted by the base station and propagate this synchronization by emitting synchronization signals (the arrows SS1 and SS4 pointing upwards) based on their own detection of SS0. Upon detection of SS1 and SS4, UE2 and UE5 are respectively synchronized to UE1 and UE4 and emit respectively SS2 and SS5. This is repeated with UE3 and UE6 which emit respectively SS3 and SS6.

Due to different distance, different relative speed compared to each emitter of synchronization signal and to different hardware characteristics of the UEs, the synchronization signals SS3 and SS6 detected (the arrows SS3 and SS6 pointing downwards) by UE7 experience a time difference $\Delta t$. In such situation it is said that the synchronization of the cluster UE1, UE2, UE3 and the cluster UE4, UE5, UE6 diverge. Consequently, UE7 will consider SS3 and SS6 as resulting from two different synchronization sources and UE7 will synchronize based on the strongest signal among SS3 and SS6. Having such clusters diverging may reduce the potential D2D communication that can be established, for example, between one UE among one cluster and one UE among the other cluster, therefore, reducing communication efficiency.

Figure 2:
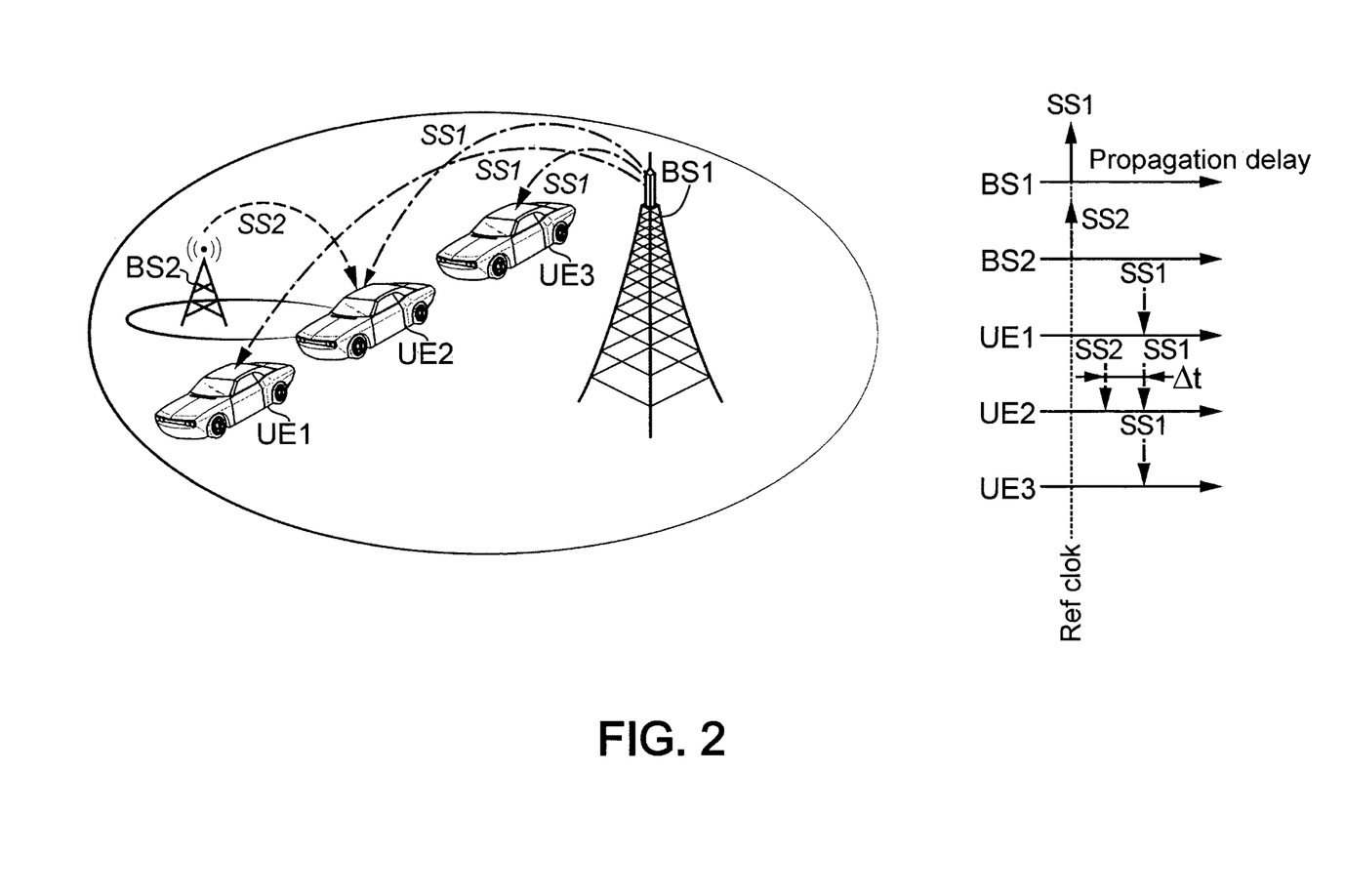
FIG. 2 illustrates one cluster of UEs and two base stations according to the invention.

In the example of FIG. 2, three UEs (UE1, UE2, UE3) travelling under the coverage of BS1 temporarily detect the sync message SS2 of BS2 which has a smaller coverage. The two BS are synchronized at the Ref clock but from the point of view of the UEs the path to receive the synchronization signal SS1 from BS1 is longer than the path to receive the synchronization SS2 from BS2, therefore the propagation delays differ. The synchronization signals SS1 and SS2 detected by UE2 experience a time difference of $\Delta t$. UE2 will consider SS1 and SS2 as resulting from two different synchronization sources. Thus, since the power of SS2 is stronger than the power of SS1 at UE2, UE2 will synchronize to BS2. Since UE1 and UE3 are synchronized to BS1, when UE2 synchronizes to BS2, UE2 will drop out of the synchronization cluster (UE1, UE2, UE3) and stop communicating with UE 1 and UE3.

Figure 3:
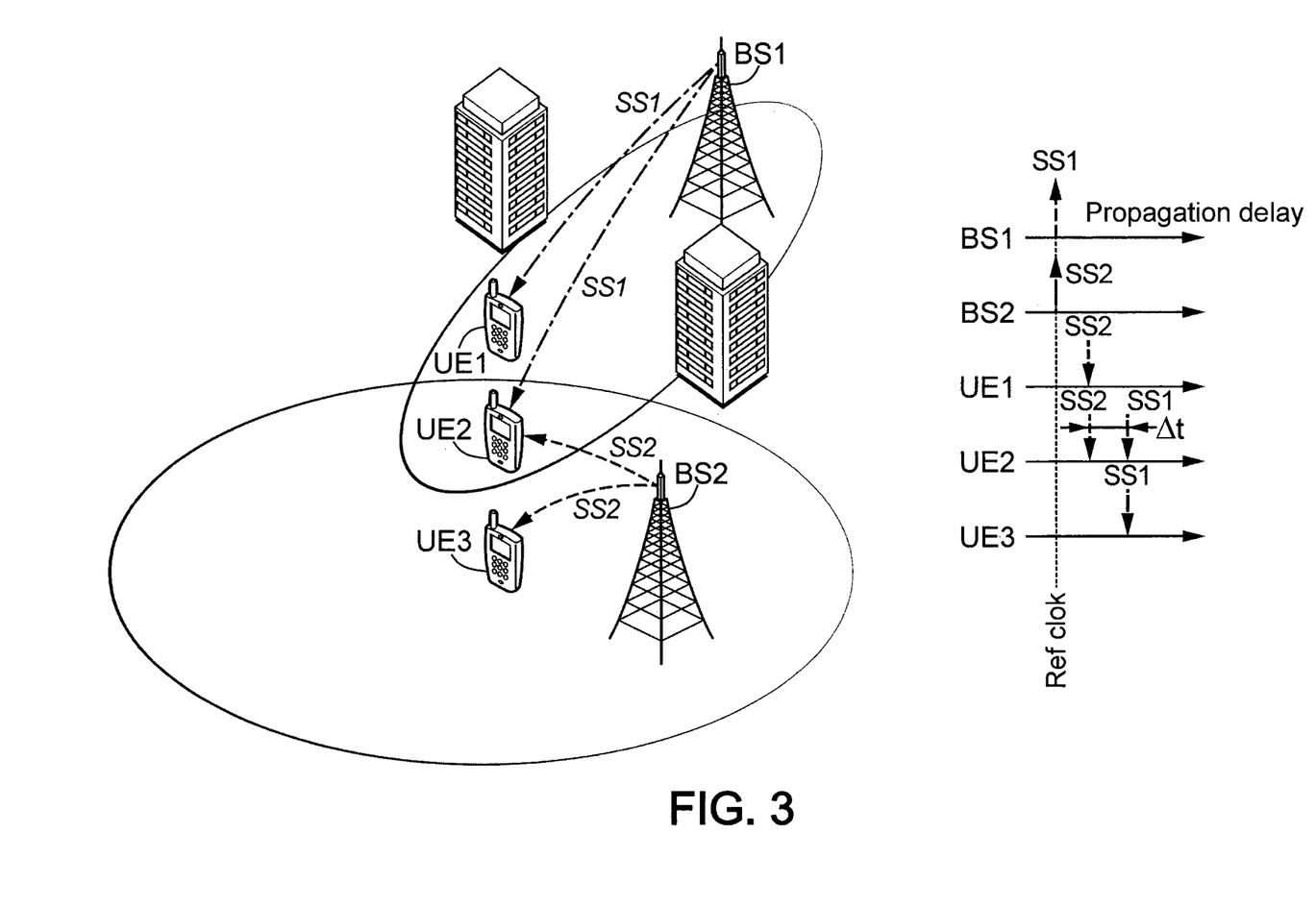
FIG. 3 illustrates one cluster of UEs and two base stations according to the invention.

In the example of FIG. 3, two UEs, UE1 and UE2 are both synchronized to BS1, thus forming a cluster of UEs that can perform D2D communications together. UE3 is synchronized to BS2. BS1 and BS2 are also synchronized together. However, since the propagation path between BS2 and UE3 is longer than propagation path between BS1 and UE1 or UE2, UE2 and UE3 are not synchronized. In addition, UE3 cannot synchronize directly with UE2 based on the synchronization signal emitted by UE2 since BS2 is a source with a higher level of priority than UE2. Therefore, even though UE3 is synchronized with a source which is also synchronized (synchronized on Ref clock) with the synchronization source used by UE1 and UE2, UE3 cannot communicate through a D2D communication with the cluster UE1 and UE2.

Figure 4:
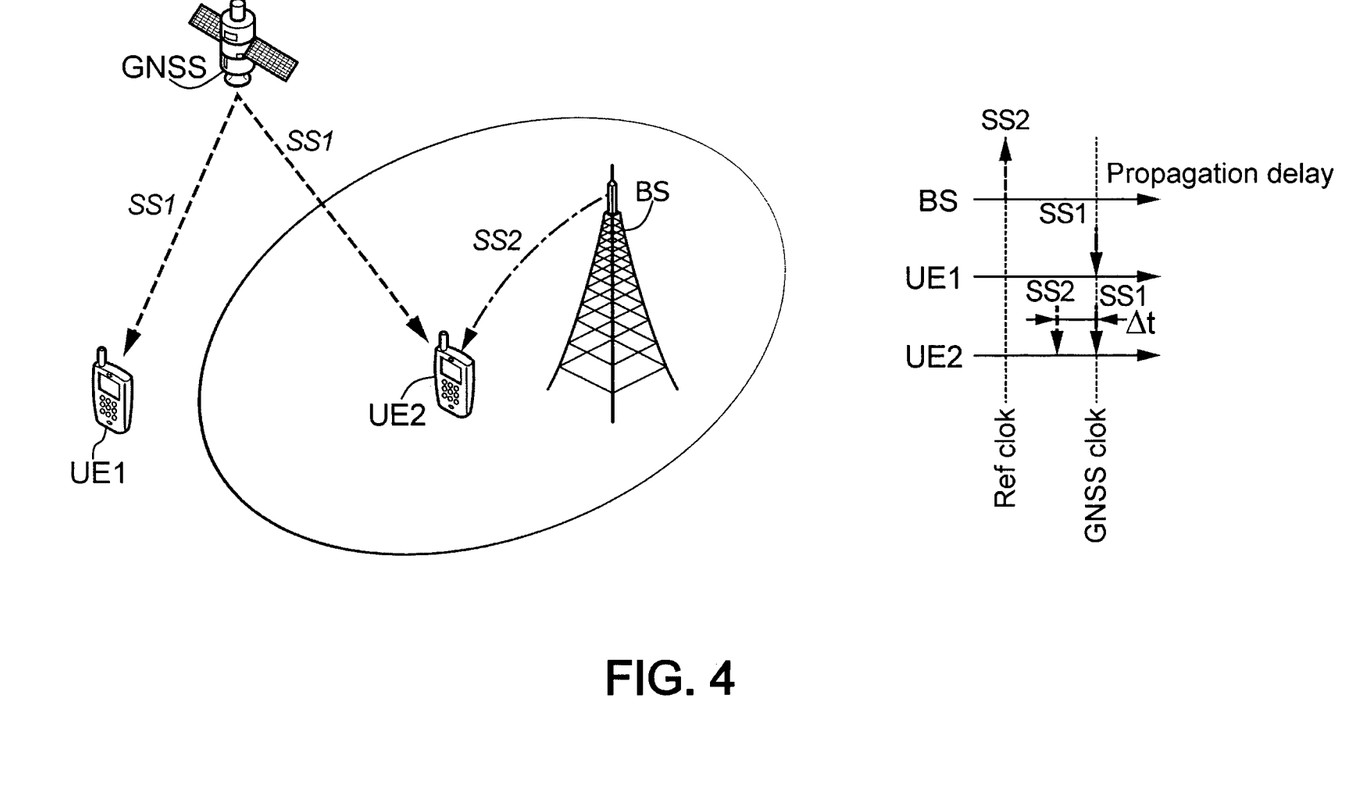
FIG. 4 illustrates one cluster of UEs, one base station and one GNSS according to the invention.

In the example of FIG. 4, UE2 is synchronized to BS and UE1 is synchronized to a GNSS. If UE2's predefined priority rule for synchronization is: highest priority level affected to BS then to GNSS and then to other UE for example, UE2 will in priority synchronize to the BS1 (synchronized on Ref clock). Thus, it will not be possible to synchronize UE1 and UE2. Therefore, even though UE2 receives the synchronization signal SS1 from the GNSS, UE1 and UE2 cannot communicate through a D2D communication. On the other hand, if UE2's predefined priority rule for synchronization is: highest priority level affected to GNSS then to BS and then to other UE for example, it becomes possible to synchronize UE1 and UE2 but UE2 will no longer be synchronized to the BS in whose coverage it is.

SUMMARY OF INVENTION

In these examples, devices which are sufficiently close to each other cannot enter in D2D communication or lose their communication due to desynchronization. This desynchronization on a small geographic scale of devices in a D2D communication network is more likely to occur in the new standard NR and with the new services provided. Indeed, in a near future it will be necessary to consider fast moving devices and/or strong fading of radio signal.

The present invention aims at improving the situation of two proximate devices that cannot synchronize efficiently.

To this end, the invention relates to a method implemented by a device for processing synchronization data in a device-to-device communication system, said method comprising:

Receiving a first synchronization signal and a first information associated to a first initial synchronization source, such as the first synchronization signal is either an initial synchronization signal emitted by the first initial synchronization source or a synchronization signal emitted by another device which is synchronized based on the first initial synchronization source;

receiving a second synchronization signal and a second information associated to a second initial synchronization source, such as the second synchronization signal is either an initial synchronization signal emitted by the second initial synchronization source or a synchronization signal emitted by another device which is synchronized based on the second initial synchronization source;

wherein, said second initial synchronization source being either the first initial synchronization source or another initial synchronization source than the first initial synchronization source;

wherein the initial synchronization signal emitted by the first respectively the second initial synchronization source does not depend on the reception by the first respectively the second initial synchronization source of another synchronization signal.

A synchronization signal is a signal enabling a device of the D2D communication system to synchronize. These signals are emitted by a synchronization source. Synchronization sources can be any entity which can emit such synchronization signal. For example, a synchronization source may be a primary synchronization source, such as a GNSS or a base station such as an evolved-NodeB in LTE or a gNodeB in NR. A synchronization source may also be a device which is either synchronized directly or indirectly (that is through the intermediary of another device) to a primary source. A synchronization source may also be a device which emits synchronization signals without previously being synchronized to another synchronization source, that is, based on a received synchronization signal.

An initial synchronization source serves as a time reference in the D2D communication system. It is the initial synchronization source which initiates the first synchronization signal enabling the devices to synchronize to it. Therefore, the synchronization signals emitted by the initial synchronization sources do not depend on the reception by the initial synchronization sources of other synchronization signals. Therefore, base stations (and more generally any wireless access point), GNSS and devices which emit synchronization signals without directly relaying the timing indicated by another synchronization source are initial synchronization sources. Several initial synchronization sources can use the same reference clock and therefore be synchronized together. Initial synchronization signals are synchronization signals emitted by initial synchronization source. For example, a gNB or a eNB are considered as being initial synchronization sources even if they may use, as an implementation feature, a GNSS information to correct the drift of their internal clock before issuing the initial synchronization signal. When emitting an initial synchronization signal, a gNB or a eNB indicate a timing based on their own clock and do not simply transfer timing information acquired from another eNB/gNB (e.g. through a SSB), even though different methods can be employed for limiting the clock drifts among different synchronized base stations.

By a device synchronized based on an initial synchronization source it is understood that the device is synchronized either directly by an initial synchronization signal emitted by this initial synchronization source or indirectly by another device which is also synchronized based on the initial synchronization source.

Information associated to an initial synchronization source are information relative to or more generally dependent on the timing indicated by the initial synchronization sources. These information associated to the initial synchronization sources may enable the device to determine if the initial synchronization sources are or not synchronized and/or determine a time difference between the timing indicated by the initial synchronization sources (such as, for example, difference between the respective frame starts and/or difference between the respective reference clocks of the initial synchronization sources).

The device receives two synchronization signals as in the previously described examples. In addition, for each synchronization signal the device receives information associated to the initial synchronization source of these signals. Based on the information the device can determine if the first and second initial synchronization source are synchronized. Therefore, the invention enables the device to resolve the conflict between several synchronization sources of the same level of priority and optimize the use of several synchronization sources of different priority level. That is, to enable the device to use synchronization sources with lower priority level to perform the D2D communication like it can be seen with UE3 in FIG. 3, which could use UE2 as a synchronization source since he knows that this source is synchronized to the same reference clock as he is. On the other hand UE2 can manage to synchronize through BS2 in the case UE2 leaves the coverage of BS1 (for example by moving out or due to a fading of the radio signal of BS1), which may occur in the case BS1 is a gNB with a small coverage compared to BS2 which could be a eNB with a large coverage. In addition, the coverage zone of BS1 can be strongly affected by its environment (for example, buildings . . . )

Therefore, based on the additional information transmitted to the device, the invention enables the device to enhance the management of his synchronization in a context where the synchronization sources are multiple and their synchronization signal may, from the point of view of the device, vanish or appear rapidly.

Therefore, according to an aspect of the invention, the invention further comprises managing synchronization of the device according to the synchronization signals and to the information on the two initial synchronization sources.

By managing synchronization it is understood that the device when receiving two or more synchronization signals along with the information associated to the initial synchronization sources determines its synchronization reference for example by determining:

To which synchronization sources it will synchronize; or
To synchronize with another source than the one it is synchronized with; or
To stay synchronized with the source with which it is synchronized; or
To combine the different synchronization signals received.

According to an aspect of the invention, the device may also manage the synchronization procedure according to the synchronization signals and to the information on the two initial synchronization sources, that is, that the device may:

determine synchronization information to be sent to other devices the device can communicate with (for example, sending information on a time difference as it will be seen after), or
determine synchronization information to be sent to the base station (for example the eNB or gNB) the device is attached to.

Furthermore, the device synchronized based on a synchronization signal and on information associated to an initial synchronization source is able of emitting at least one other synchronization signal and the information associated to the initial synchronization source corresponding to the other synchronization signal. Furthermore, the step of managing synchronization involves a step of jointly or combined processing the first and second synchronization signals and the first and second information associated to the first and second initial synchronization sources.

In a variant, the first synchronization signal provides the synchronization reference for the device, and the second reference signal has the same or a higher priority level than the first synchronization signal. Thus, only synchronization information which is at least as reliable as the synchronization information used by the device for its own synchronization is processed.

The device may also transmit this information associated to initial synchronization source(s) to other devices, to enable these other devices to enhance the management of their synchronization in a context where the synchronization sources are multiple and their synchronization signal may, from the point of view of the device, vanish or appear rapidly.

According to an aspect of the invention, the device determines if the first initial synchronization source is synchronized with the second initial synchronization source based on the first and second information.

According to an aspect of the invention, the first respectively the second information comprises a first respectively a second synchronization ID, if the first synchronization ID is identical to the second synchronization ID the device determines that the first and second initial synchronization sources are synchronized, if the first synchronization ID is different from the second synchronization ID the device determines that the first and second initial synchronization sources are not synchronized.

The synchronization ID is therefore an ID which enables to distinguish if two initial synchronization sources are synchronized or not. Therefore, it enables the device to easily determine if the first initial synchronization source is synchronized with the second initial synchronization source. All the initial synchronization sources are split in classes, initial synchronization sources of the same class are synchronized.

The synchronization ID may be explicit, that is, an ID is assigned to each class, or the synchronization ID may be implicit, that is, the synchronization ID may be retrieved through other information. For example, the PSSS and/or SSSS values may be divided into ranges, each range corresponding to a class of initial synchronization sources. When transmitting its synchronization signal, the device will use PSSS and/or SSSS values which correspond to the initial synchronization source based on which it is synchronized. The device which receives such synchronization signal will determine the values of the PSSS and/or SSSS and therefore will be able to deduce the class of the initial synchronization source. Of course the devices in the D2D communication network must be previously configured or informed of the different ranges.

According to an aspect of the invention, the device determines if the first initial synchronization source is the second initial synchronization source based on the first and second information.

According to an aspect of the invention, the first respectively the second information comprises a first respectively a second synchronization ID, if the first synchronization ID is identical to the second synchronization ID the device determines that the first initial synchronization source is the second initial synchronization sources, if the first synchronization ID is different from the second synchronization ID the device determines that the first and second initial synchronization sources are different.

In this case, the synchronization ID may be a unique ID of the initial synchronization source. The characteristics of unique may be seen for example within a network (for example an physical ID of the equipment representing the initial synchronization source) or within a restricted geographical area (for example a PCI, physical cell ID).

In yet another variant, the device determines if the first initial synchronization source is geographically collocated with the second initial synchronization source based on the first and second information.

According to an aspect of the invention which further comprises receiving information on groups of synchronized initial synchronization sources, two initial synchronization sources from a same group of synchronized initial synchronization sources being synchronized, wherein determining if the first initial synchronization source is synchronized with the second initial synchronization source comprises determining a group for each of the first and second initial synchronization sources based on the information on groups and on the first and second information.

Therefore, the device previously receives or is initially configured with information on groups, for example a list of initial synchronization sources which are regrouped according to whether or not they are synchronized, that is, sorted by class. Based on information associated to an initial synchronization source received and on the list, the device can identify in which group is the corresponding initial synchronization source and therefore determined if the corresponding initial synchronization source is or not synchronized with another initial synchronization source.

Each initial synchronization source may be identified with an ID in the information on groups and the received information associated to the synchronization source may contain the ID of the source.

According to an aspect of the invention at least one synchronization signal among the first and the second synchronization signal received is emitted by another device, said another device transmits to the device information among the first and second information, said information among the first and second information corresponding to the at least one synchronization signal.

The device obtains the information associated to the initial synchronization source through the device which emits the synchronization signal. This enables to implement efficiently the invention even when several intermediate devices have been involved to propagate the initial synchronization signal before the final device receives a synchronization signal.

According to an aspect of the invention, if the first and second synchronization signals are non-aligned, transmitting to at least one other device an information about a timing difference between the first and second synchronization signals and the first and second information.

By non-aligned synchronization signals it is understood that the UE, without the information associated to the initial synchronization signals would consider these synchronization signals as being emitted by different sources. Put in another way, regarding the actual standard two non-aligned synchronization signals are signals that are received with a time difference greater than a threshold. Such threshold can be defined by the intrinsic capacity of the components of the device which under a certain difference are unable to distinguish the starting point of two signals. The threshold may also be set as a value in the standards. The information about a timing difference can for example include the computed value of the time difference between the two synchronization signals.

When such non-aligned signals are received, the device transmits to at least one other device an information about the time difference observed at the device between the first received signal and the second received signal along with the information associated to the corresponding initial synchronization source(s). The transmitting of such information to another device in the vicinity of the device enables the another device to collect information associated to the synchronization sources operating on the basis of a larger scale and with higher relevancy.

By time difference (or timing difference) observed at the device between the first received signal and the second received signal we understand for example the time difference computed at the receiver side between the respective frames emitted by the two entities who emitted the first and second signals. More precisely, the time difference between the first received signal and the second received signal may be theoretical and depending on the standard the device which receives synchronization signals may determine the time difference either by computing the time difference between the time of reception of each synchronization signal or between two times respectively deduced from the reception of each synchronization signal, for example the time difference computed at the receiver side between the respective frames emitted by the two entities who emitted the first and second signals, the respective frames being deduce based on the reception of the synchronization signals. Thus, the timing difference between the first and second synchronization signals and the first and second information is a time difference between two frame reference times deduced respectively from or based on the first and second synchronization signals. The frame reference times may be indicated by the synchronization signals. Therefore, initial synchronization signal the following the invention may be applied based on either the reception time of the synchronization signal, the frame reference time deduced from the synchronization signal and/or the beginning of the frame indicated by the synchronization signal. Thus, these *termes* are considered as synonymous.

Therefore, if the two initial synchronization sources are synchronized, such information about the time difference enables to synchronize with a device synchronized based on either one or the other initial synchronization signal based on the detection of only one of the two synchronization signals (for example the strongest signal). In addition, such information enables the device to be more precisely synchronized and/or to have a more stable synchronization.

Therefore, the another device can manage (as previously described with the device which receives the first and second synchronization signals) his synchronization based on more accurate information and information regarding the whole cluster which is the relevant scale to consider when looking to connect with the devices of a cluster. Consequently, the invention reduces the drops out of the cluster and enables low latency communication requiring high accuracy synchronization between nodes of the D2D communication system.

According to an aspect of the invention the method further comprises determining if the first and second synchronization signals are non-aligned and determining a timing difference between the first and second synchronization signal.

This enables to synchronize with a device synchronized based on a first initial synchronization source and maintaining such synchronization by only detecting (once the timing difference has been computed or received from another device) the strongest synchronization signal received from one other initial synchronization source or from a device synchronized with this other initial synchronization source, when this other initial synchronization source and the first initial synchronization source are synchronized or more generally when the time difference between the reference clocks of these two initial synchronization sources is known (for example, it may be computed based on the first and second information). Therefore, the device can use more relevant synchronization sources regarding its situation to synchronize with the device synchronized based on other initial synchronization sources. This enables to ease the synchronization of each device while maintaining synchronization of the device in the cluster.

According to an aspect of the invention the method further comprises, if the first and second synchronization signals are non-aligned and if the first initial synchronization source is synchronized with the second initial synchronization source, determining if the first initial synchronization source is the second initial synchronization source, if so transmitting information that the first initial synchronization source is the second initial synchronization source to the at least one other device.

Thus, two different clusters in which the devices are synchronized based on the same initial synchronization source can be reunited or at least make their synchronization converge. For example, by selecting the minimum receiving time or averaging several receiving time of synchronization signals as it will be seen.

This is particularly relevant in the context where the first synchronization signal and the second synchronization signal are sent by devices of the device-to-device communication network. In this context the invention may further comprise transmitting to at least one of the device which transmitted one of the synchronization signals an information about a timing difference between the first and second synchronization signals and an information that the first and second initial synchronization source are synchronized or the same.

According to an aspect of the invention determining if the first initial synchronization source is the second initial synchronization source is done based on the first and second information or by comparing the timing difference with a threshold.

That is, if the time difference between the first synchronization signal and the second synchronization signal is below a threshold, the devices considers that the first initial synchronization source and the second initial synchronization source are the same. Since the first synchronization signal and the second synchronization signal are non-aligned the time difference is also above a lower threshold. The use of a threshold to determine if the two initial synchronization sources are the same enables to avoid additional synchronization information. The use of the first and second information to determine if the first initial synchronization source is the same than the second initial synchronization source enables to reduce the computing.

According to an aspect of the invention at least a synchronization signal among the first synchronization signal and the second synchronization signal is emitted by an initial synchronization source and further comprises transmitting to the one other device information that the first initial synchronization source and the second initial synchronization source are synchronized.

Therefore, the cluster of devices to which is synchronized the device which receives the two synchronization signals can benefit from another synchronization source and specifically an initial synchronization source, without having all the devices of the cluster receiving an initial synchronization signal from this initial synchronization source directly or indirectly (by the intermediate of other devices). This is particularly relevant when the initial synchronization source is a primary source.

According to an aspect of the invention the first initial synchronization source and the second initial synchronization source are synchronization sources among radio base stations and/or a global navigation satellite system.

According to an aspect of the invention, the invention further comprises receiving a third synchronization signal and receiving a third information associated to a third initial synchronization source, such as the third synchronization signal is either an initial synchronization signal emitted by the third initial synchronization source or a synchronization signal emitted by another device which is synchronized based on the third initial synchronization sources, wherein if the second initial synchronization source and third initial synchronization source are synchronized, transmitting to at least one other device the first and second information and:
    an information about a timing difference between the first synchronization signal and the second synchronization signal,
        if power of the second synchronization signal is higher than power of the third synchronization signal, or
        if a beginning of a frame transmitting the second synchronization signal is received before a beginning of a frame transmitting the third synchronization signal, that is, if a beginning of a frame indicated by the second synchronization signal is before a beginning of a frame indicated by the third synchronization signal;
    an information about a timing difference between the first synchronization signal and a computed synchronization signal, the computed synchronization signal being computed based on the second synchronization signal and according to an estimated propagation delay or a minimum propagation delay between the emitter of the second synchronization signal and the device.

When a device of the cluster of device receives several synchronization signals from several initial synchronization sources and/or from devices synchronized to those several initial synchronization sources, if those initial synchronization sources are synchronized and therefore belong to the same class the device can select a specific synchronization signal among the synchronization signals received which can represent the class. For example, the one with the highest power or the one with the minimum clock, that is, the one which indicates the frame which arrives first.

It is also advantageous to compute a synchronization signal which takes into account the propagation delay between the device and the emitter of the synchronization signal.

This enables to optimize the information on the timing difference which is then more likely to be relevant from the point of view of the other devices in the cluster.

According to an aspect of the invention the invention further comprises receiving several synchronization signals and receiving information associated to several corresponding initial synchronization sources, such as, each synchronization signal among the several synchronization signals is either an initial synchronization signal emitted by a corresponding initial synchronization source among the several corresponding initial synchronization sources or a synchronization signal emitted by another device which is synchronized based on the corresponding initial synchronization sources, the several corresponding initial synchronization sources being synchronized with the second initial synchronized source;
    transmitting to at least one other device an information about a timing difference between the first synchronization signal and a combination of the second synchronization signal and the several synchronization signals and the first and second information.

When a device of the cluster of device receives several synchronization signals from several initial synchronization sources and/or from devices synchronized to those several initial synchronization sources, if those initial synchronization sources are synchronized and therefore belong to the same class the device can compute a synchronization signal which can represent the class. For example, the synchronization signal computed can be for example combination (e.g. average, weighted average, etc.) of the timing of the synchronization signals. This enables to optimize the information on the timing difference which is then more likely to be relevant from the point of view of the other devices in the cluster.

In a variant, only selected devices are allowed to transmit information about a timing difference. Selection may be made by configuration or by pre-configuration, or based on the device capability. For example, only devices designated by the network, or denoted as a local manager or as a groupcast leader are allowed to transmit information about timing difference. Thus, the signaling overhead is reduced and only information from selected sources is transferred.

In a variant, the device transmits a timing difference when first synchronization signal provides the synchronization reference for the device, and the second reference signal has the same or a higher priority level than the first synchronization signal. Thus, the procedure for synchronization search of the devices receiving the timing difference is simplified.

A second aspect of the invention concerns a computer program product comprising code instructions to perform the method as described previously when said instructions are run by a processor.

A third aspect of the invention concerns a device in a device-to-device communication system, said device comprising:
- at least one antenna;
- a processor; and
- a non-transitory computer-readable medium comprising instructions stored thereon, which when executed by the processor configure the device to:
- receive a first synchronization signal and receive a first information associated to a first initial synchronization source, such as the first synchronization signal is either an initial synchronization signal emitted by the first initial synchronization source or a synchronization signal emitted by another device which is synchronized based on the first initial synchronization sources;
- receive a second synchronization signal and receive a second information associated to a second initial synchronization source, such as the second synchronization signal is either an initial synchronization signal emitted by the second initial synchronization source or a synchronization signal emitted by another device which is synchronized based on the second initial synchronization sources;
- wherein, said second initial synchronization source being either the first initial synchronization source or another initial synchronization source than the first initial synchronization source;
- wherein the initial synchronization signal emitted by the first respectively the second initial synchronization source does not depend on the reception by the first respectively the second initial synchronization source of another synchronization signal.

A fourth aspect of the invention concerns a device in a device-to-device communication system, said device comprising:
- at least one antenna;
- a processor; and
- a non-transitory computer-readable medium comprising instructions stored thereon, which when executed by the processor configures the device to:
- receive a synchronization signal and receive an information associated to an initial synchronization source, such as the synchronization signal is either an initial synchronization signal emitted by the initial synchronization source or a synchronization signal emitted by one other device which is synchronized based on the initial synchronization source;
- emit a synchronization signal based on the received synchronization signal and emit information associated to the initial synchronization source.

In a variant, the device uses a different synchronization signal as synchronization reference for its internal synchronization.

A fifth aspect of the invention concerns a method implemented by a device-to-device communication system comprising: a first device according to the third aspect of the invention, a second device according to the fourth aspect of the invention, a first initial synchronization source, and a second initial synchronization source, the method comprises:
- the reception by the first or the second device of a first synchronization signal and an information associated to the first initial synchronization source, such as the first synchronization signal is either the first initial synchronization signal emitted by the first initial synchronization source or a synchronization signal emitted by one other device which is synchronized based on the first initial synchronization source;
- the emission by the second device of a third synchronization signal based on the first synchronization signal and the emission of an information associated to the first initial synchronization source if the second device receives the first synchronization signal;
- the reception by the first device of the second synchronization signal and either the first and/or the third synchronization signal;
- the transmission by the first device to a third device of the device-to-device system of an information about a timing difference between the second synchronization and one among the first and third synchronization signal and the first and second information.

BRIEF DESCRIPTION OF DRAWINGS

The present invention is illustrated by way of example, and not by way of limitation, in the figures of the accompanying drawings, in which like reference numerals refer to similar elements and in which.

DESCRIPTION OF EMBODIMENTS

Figure 5:
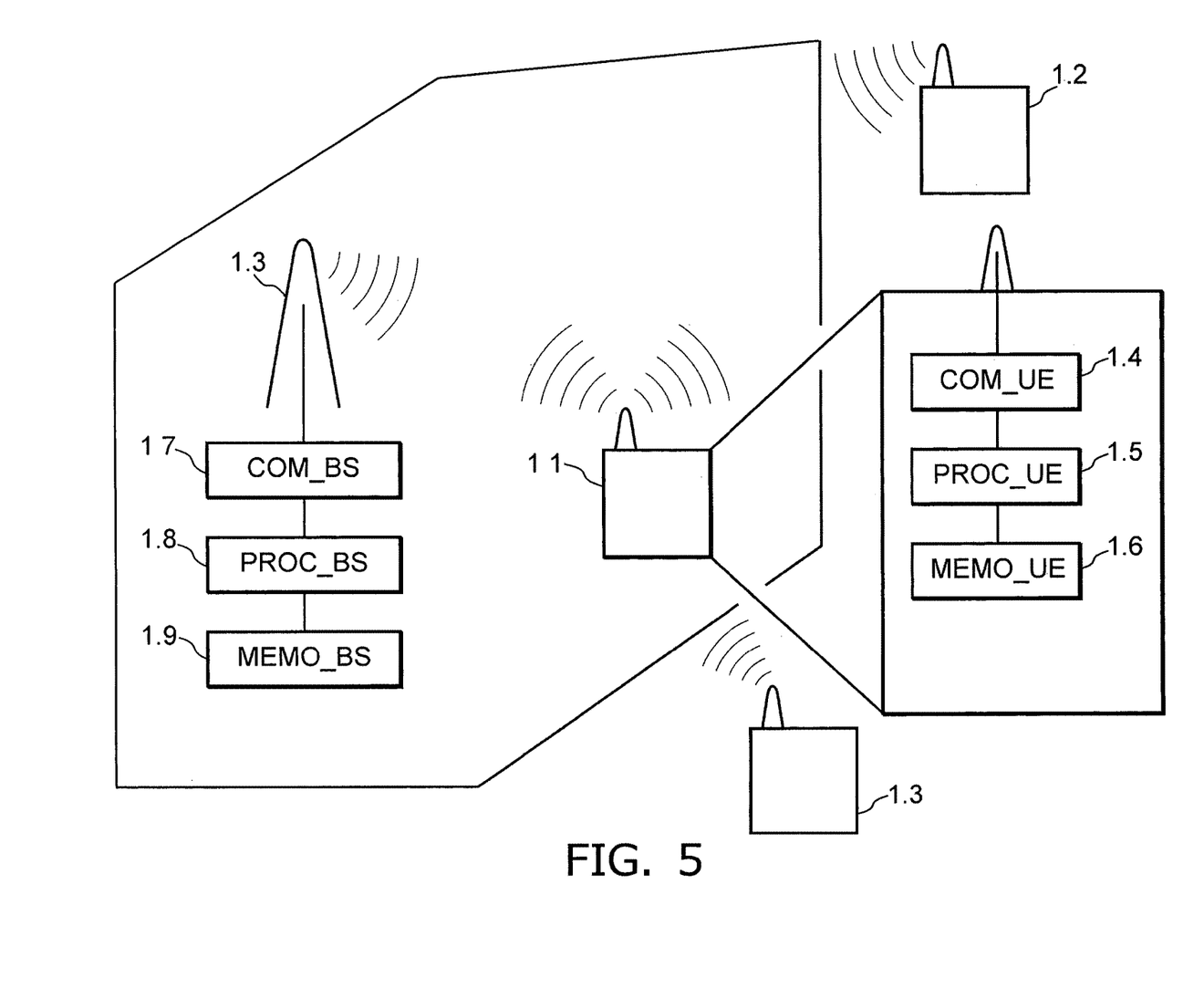
FIG. 5 illustrates a device according to the invention.

Referring to FIG. 5, there is shown two devices 1.1 and 1.2 and a base station 1.3. One device 1.1 is in the coverage area of the base station 1.3 and the over device is not in coverage area of the base station 1.3. In the context of the LTE or NR standard 1.1 the base station 1.3 is an eNodeB (evolved-NodeB) or a gNodeB and the devices are user equipments UEs.

Each device 1.1 and 1.2 comprises one communication module (COM_UE) 1.4, one processing module (PROC_UE) 1.5 and a memory unit (MEMO_UE) 1.6. The MEMO_UE 1.4 comprises a non-volatile unit which retrieves the computer program and a volatile unit which retrieves parametrization of the D2D communication system for example information on groups of synchronized initial synchronization sources (for example lists of initial synchronization source IDs), predetermined thresholds, . . . . The PROC_UE 1.5 is configured to:

detect synchronization signals;
determine if several initial synchronization sources are synchronized;
transmit to a device information associated to the synchronization of the initial synchronization sources to other device;
emit synchronization signals;
transmit to a device information associated to the initial synchronization sources;
determine a timing difference between several received synchronization signal;
transmit to a device information about the timing difference;
manage synchronization.

The COM_UE 1.3 is configured to receive and transmit synchronization signals and information with the other device 1.1 or 1.2 and to receive synchronization signals and information from the BS 1.3.

The BS 1.3 comprises one communication module (COM_BS) 1.7, one processing module (PROC_BS) 1.8 and a memory unit (MEMO_BS) 1.9. The MEMO_BS 1.8 comprises a non-volatile unit which retrieves the computer program and a volatile unit which retrieves parametrization of the D2D communication system for example the ID or synchronization ID of the BS 1.3. The PROC_BS 1.7 is configured to process synchronization signals. The COM_BS 1.6 is configured to emit the processed synchronization signal.

Figure 6:
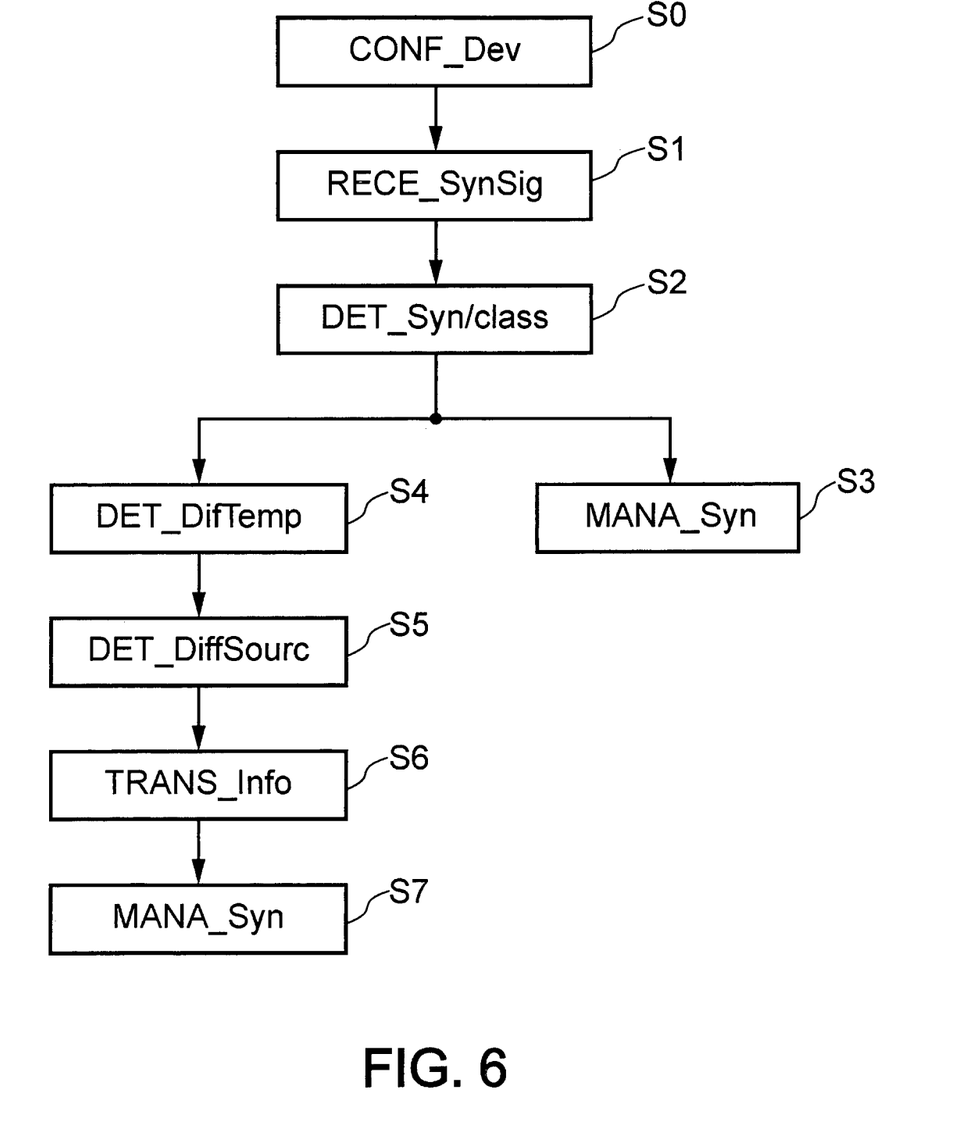
FIG. 6 illustrates a flowchart representing an embodiment of the invention.

Referring to FIG. 6 there is shown a flowchart representing the steps of an embodiment according to the invention.

At step S0 the device 1.1 is parametrized. Therefore, the device can receive from a BS or another device of the D2D communication system information enabling the implementation of the invention. For example, the device 1.1 may receive information associated to groups of synchronized initial synchronization sources. For example, the device receives from the BS 1.3 or another device 1.2 a lists of initial synchronization source IDs, with the synchronization source IDs sorted by groups of synchronized initial synchronization source. The device may also receive: predetermined threshold and algorithm.

At step S1 the device 1.1 receives at least two synchronization signals (SS1, SSN). By receiving synchronization signals it is understood that the device 1.1 is sufficiently close to the corresponding sources of synchronization signals and detects those synchronization signals.

As mentioned before, several sources of synchronization signal exist, which are BSs 1.3, GNSS and other devices 1.2. In the context of LTE or NR the standard specifies the format of the synchronization signals emitted by the BS 1.3 and by other devices 1.2.

When emitted by the BS 1.3 the synchronization signal is for example a SS block composed of a primary synchronization signal PSS, a secondary synchronization signal SSS and a broadcast channel PBCH. These PSS and SSS are sent by the BS in specific locations of certain frames, with a configured periodicity. When PSS and SSS are detected the device 1.1 is able to determine the cell's ID and decode PBCH in order to determine the timing of the cell (for example by deducing the frame reference time), that is to identify the beginning and duration of the frames emitted by the BS. When knowing the beginning of the frame (for example by deducing the frame reference time) as indicated by the synchronization signal, the device 1.1 is able to fully synchronize with the radio cell.

When emitted by another device 1.2 the synchronization signals (referred as SLSS sidelink synchronization signal for V2X communication) is composed of a primary sidelink synchronization signal PSSS and a secondary sidelink synchronization signal SSSS. These PSSS and SSSS are sent by the device in specific locations of certain frames. When PSSS and SSSS are detected the device 1.1 is able to decode PSBCH and determine the beginning of the frame. The device 1.1 is thus able to fully synchronize to the device 1.2.

The synchronization signal may also be sent by a GNSS which, depending on the considered GNSS, has its own format.

Each synchronization signal (SS1, SSN) received by the device 1.1 may be emitted by another device 1.2, a BS 1.3 or a GNSS.

When emitted by another device 1.2, two cases are to be considered, the other device 1.2 is synchronized based on an initial synchronization source which is a primary synchronization source (BS 1.3 or GNSS) or the other device 1.2 is synchronized based on an initial synchronization source which is a device, that is, from an out of coverage device 1.2 which initiated the synchronization.

Along with each emitted synchronization signal, is transmitted information associated to the initial synchronization source corresponding to the synchronization signal. This information may be an ID of the initial synchronization source, for example, the cell's ID in case the initial synchronization source is the BS 1.3 or any other specific ID which enables to identify each initial synchronization source at least in a certain geographical range. The information associated to the initial synchronization source may also be a synchronization ID, which is identical for all the initial synchronization sources in the same class, that is, for all initial synchronization sources that are synchronized.

Therefore, when a synchronization signal is received from a device 1.2, this device 1.2 also transmits with the synchronization signal the information associated to the initial synchronization source based on which he is synchronized. This information may therefore be transmitted through several devices before being received by the device 1.1 with the synchronization signal.

When the synchronization signal is received from a BS 1.3, as previously mentioned the synchronization signal enables the device 1.1 to determine a cell's ID, this ID can be used according to the invention as information associated to the initial synchronization source. If another type of information associated to the initial synchronization source is to be used, for instance a synchronization ID, this one can be transmitted for example in the frame containing the synchronization signals.

As previously mentioned the initial synchronization source corresponding to each synchronization signal SSi can be synchronized. The synchronized initial synchronization sources form a class of initial synchronization sources.

At step S2 the device determines whether or not the synchronization signals received are based on initial synchronization sources that are synchronized.

For that the device compares the information associated to the initial synchronization sources received.

If synchronization ID are used, the device compares the ID received. Each match between two IDs transmitted with a first and second synchronization signals implies that the first and second synchronization signals are issued from initial synchronization sources that are synchronized. By synchronization signal issued from initial synchronization source it is understood that the synchronization signal is either emitted by the initial synchronization source or by a device that is synchronized based on the initial synchronization source, or who is relaying the timing of the initial synchronization source.

If cell's ID or other types of IDs enabling to identify the initial synchronization sources are used, then the device 1.1 search in the list of initial synchronization source IDs. If the IDs transmitted with the first and second synchronization signals refer to initial synchronization sources in a same group then the first and second synchronization signals are issued from initial synchronization sources that are synchronized.

At step S3 the device 1.1 manages his synchronization according to the received synchronization signals (SS1, . . . , SSN) and to the information associated to the corresponding initial synchronization sources (ISS1, . . . , ISSN).

For example, in the case of FIG. 2, since BS1 and BS2 are synchronized, UE2 has no need to change his synchronization from BS1 to BS2 and thus may stay synchronized to BS1 and therefore to the other device UE3 and UE1.

In addition, since T(SS1)=T(SS2)+Δt, UE2 may use the synchronization signals SS2 emitted by BS2 to synchronize to BS1, therefore, as long as UE2 is in the coverage of BS2, UE2 no longer needs to decode SS1. T(SSi) is the starting point of the frame transporting SSi and Δt is the time difference between T(SS1) and T(SS2). This time difference should be seen modulo the frame duration, since not all frames transport SSi.

This is particularly relevant when from the point of view of UE2, the synchronization signals emitted by BS2 are stronger than the synchronization signals emitted by BS1. Therefore, the invention enables to enhance the accuracy of the process of synchronization signals detection.

For example, in the case of FIG. 1, since the two clusters are synchronized to the same BS, UE7 can synchronize to the UE which sends the first synchronization signal (SS3), that is, UE3. This enables to synchronize to the UE with the lowest synchronization latency between it and the BS. This latency can be due for example to a higher number of UEs in the cluster or a longer cumulative transmission path between the last UE and the BS.

In addition, since T(SS6)=T(SS3)+pt, UE7 may use the synchronization signals SS3 emitted by UE3 (which suffers less latency) to synchronize with UE6.

The same strategy can be applied in the case of FIG. 3 where UE2 can either synchronize to BS1 or BS2. In the case of FIG. 4 UE2 can synchronize to BS or the GNSS.

At step S4 the device 1.1 determines a timing difference between two synchronization signals or two representative synchronization signals of different classes or one synchronization signal and one representative synchronization signal.

By representative synchronization signal of a class it is understood a synchronization signal received by the device 1.1 or computed by the device 1.1, that is, that the representative synchronization signal may not exist and may only be a virtual synchronization signal.

The representative synchronization signal of a class may be:

The received synchronization signal with the highest power among the synchronization signals of the same class received by the device 1.1.

The received synchronization signal transmitted in a frame, the beginning of said frame being received before the beginning of the frames transmitting the other synchronization signals of the same class received by the device 1.1. In other words, the frame reference time deduced from the received synchronization signal being before the frame reference times deduced from the other synchronization signals of the same class received by the device 1.1, or if a beginning of a frame indicated by the received synchronization signal is before beginnings of frames indicated other synchronization signals of the same class received by the device 1.1. Said representative may be referred to as the lowest latency synchronization signal of the class.

A computed synchronization signal, which is computed by offsetting an estimated propagation delay or a minimum propagation delay to one received synchronization signal of the class, for example the lowest latency synchronization signal of the class. The estimated propagation delay or the minimum propagation delay is based on an estimation of the propagation delay between the device 1.1 and the emitter of the synchronization signal considered.

A computed synchronization signal, which is computed by combining the synchronization signals of the same class received by the device 1.1. For example, by computing an average/weighted average/etc. of the reception times of the synchronization signals of the same class received by the device 1.1.

In the example of FIG. 6, the device detetrmnes whether or not the synchronization signals received are based on initial synchronization sources that are synchronized. This step may be optional to implement steps 4 to 7, and especially to determine the timing difference. Indeed, the timing difference may be determined based on synchronization signals which are not issued from synchronized initial synchronization sources.

To determine the timing difference between two synchronization signals or two representative synchronization signals of different classes or one synchronization signal and one representative synchronization signal, the device computes the time difference Δt between the reception times of the two synchronization signals considered or the frame reference times deduced from the two synchronization signals or the beginnings of frames indicated by the two synchronization signals.

At step S5 the device 1.1 determines if the two initial synchronization sources from which are issued the received synchronization signals (or the representative synchronization signals) are the same.

This can be done using the information associated to the two initial synchronization sources. For example, if the information associated to the synchronization source contains the ID of the source. The device 1.1 may also determine this by comparing the time difference computed at step 4 with a threshold. If the time difference is under a predetermined threshold, the two initial synchronization sources are considered as synchronized.

Determining if two initial synchronization sources are the same is particularly relevant when two clusters are synchronized to the same initial synchronization source.

At step S6 the device 1.1 transmits to a device 1.3 the information determined and received, that is, the device 1.1 may transmit the computed time difference along with the information associated with the corresponding initial synchronization sources, that is, the initial synchronization sources from which are issued the synchronization signals used to compute the time difference. In case the synchronization signal used is a computed synchronization signal, the information associated to the initial synchronization source which is sent is one of the information among the information associated to initial synchronization sources of the same class.

The device 1.1 may also transmit information on the fact that the two initial synchronization sources used to compute the time difference are the same source.

At step S7 the device 1.3 manages his synchronization according to the synchronization signals it receives (SS'1, ..., SS'M), the information associated to the initial synchronization sources from which are issued these received synchronization signals (received along with the received synchronization signals) and to the information received from the device 1.1, as described in step 6.

For example, in the case of FIG. 1, UE7 may send to UE3 and/or UE6 the time difference Δt=T(SS6)−T(SS3) between the initial synchronization signals SS6 and SS3 and the information associated to the initial synchronization source BS. In addition, UE 7 may specify that the initial synchronization source is the same for each cluster.

UE3 and/or UE6 may make their synchronization converge to enable to merge the two clusters via UE7. For example, they may use distributed algorithms to converge to a common synchronization reference. For example, they may determine to follow the synchronization of one of UE3/6 and inform the remaining members of the cluster of the change so they could resynchronize based on the UE of the cluster who changed its synchronization reference (one cluster is merged into the other).

For example, in the case of FIG. 2, UE3 may receive from UE2 time difference Δt=T(SS1)−T(SS2) between the initial synchronization signals SS1 and SS2 (between the frame reference times deduced from the initial synchronization signals SS1 and SS2 or the beginnings of frames indicated by the initial synchronization signals SS1 and SS2) and the information associated to these initial synchronization sources BS1 and BS2.

Based on the information associated, UE3 is enabled to determine that BS1 and BS2 are synchronized. Therefore, when UE3 will be under cover of BS2, UE3 can use the initial synchronization signal SS2 emitted by BS2 to synchronize to BS1 since T(SS1)=Δt+T(SS2). This is particularly advantageous since SS2 may be a stronger initial synchronization signal than SS2 and also less affected by the radio channel (since the path to receive the synchronization signal SS1 from BS1 is longer than the path to receive the synchronization signal SS2 from BS2).

For example, in the case of FIG. 3, UE3 may receive from UE2 time difference Δt=T(SS1)−T(SS2) between the initial synchronization signals SS1 and SS2 and the information associated to these initial synchronization sources BS1 and BS2.

Based on the information associated, UE3 is enabled to determine that BS1 and BS2 are synchronized.

Therefore, UE3 can synchronize to the cluster UE1 and UE2 based on the initial synchronization signal SS2 received from BS2, since T(SS1)=Δt+T(SS2).

For example, in the case of FIG. 4, UE1 may receive from UE2 time difference Δt=T(SS1)−T(SS2) between the initial synchronization signals SS1 and SS2 and the information associated to these initial synchronization sources BS1 and BS2.

Based on the time difference UE1 may synchronize to UE2 based on the initial synchronization signal SS1 received from the GNSS, since T(SS1)=Δt+T(SS2).

In these examples only one or two initial synchronization sources are represented, however, as mentioned above more than two initial synchronization sources may be involved in the synchronization process. In this case the UE may synchronize based on the representative synchronization signal.

The invention claimed is:

1. Method implemented by a device for receiving synchronization data in a device-to-device communication system, said method comprising:
   receiving a first synchronization signal and a first information associated to a first initial synchronization source, such as the first synchronization signal is either an initial synchronization signal emitted by the first initial synchronization source or a synchronization signal emitted by another device which is synchronized based on the first initial synchronization sources;
   receiving a second synchronization signal and a second information associated to a second initial synchronization source, such as the second synchronization signal is either an initial synchronization signal emitted by the second initial synchronization source or a synchronization signal emitted by another device which is synchronized based on the second initial synchronization sources;
   determining if the first initial synchronization source is synchronized with the second initial synchronization source based on the first and second information, the first information comprising an ID associated with the first initial synchronization source and the second information comprising an ID associated with the second initial synchronization source;
   wherein, said second initial synchronization source being either the first initial synchronization source or another initial synchronization source than the first initial synchronization source;
   wherein the initial synchronization signal emitted by a first respectively the second initial synchronization source does not depend on the reception by the first respectively the second initial synchronization source of another synchronization signal.

2. The method according to claim 1, further comprises, managing synchronization of the device according to the synchronization signals and to the information associated to the two initial synchronization sources.

3. The method according to claim 1,
   wherein the first respectively the second information comprises a first respectively a second synchronization ID, if the first synchronization ID is identical to the second synchronization ID the device determines that the first and second initial synchronization sources are synchronized, if the first synchronization ID is different from the second synchronization ID the device determines that the first and second initial synchronization sources are not synchronized.

4. The method according to claim 1, further comprising:
   receiving information on groups of synchronized initial synchronization sources, two initial synchronization sources from a same group of synchronized initial synchronization sources being synchronized,
   wherein determining if the first initial synchronization source is synchronized with the second initial synchronization source comprises determining a group for each of the first and second initial synchronization sources based on the information on groups and on the first and second information.

5. The method according to claim 4,
   wherein information on groups of synchronized initial synchronization sources comprises groups of initial synchronization source IDs, wherein the first respectively the second information comprises an ID of the first respectively the second initial synchronization source.

6. The method according to claim 1,
wherein at least one synchronization signal among the first and the second synchronization signal received is emitted by another device, said another device transmits to the device information among the first and second information, said information among the first and second information corresponding to the at least one synchronization signal.

7. The method according to claim 1, further comprises,
if the first and second synchronization signals are non-aligned, transmitting to at least one other device an information about a timing difference between the first and second synchronization and the first and second information.

8. The method according to claim 7, further comprises,
if the first and second synchronization signals are non-aligned and if the first initial synchronization source is synchronized with the second initial synchronization source,
determining if the first initial synchronization source is the second initial synchronization source,
if so transmitting information that the first initial synchronization source is the second initial synchronization source to the at least one other device.

9. The method according to claim 8,
wherein determining if the first initial synchronization source is the second initial synchronization source is done based on the first and second information or by comparing the timing difference with a threshold.

10. The method according to claim 7,
wherein at least a synchronization signal among the first synchronization signal and the second synchronization signal is emitted by an initial synchronization source and further comprises transmitting to the one other device information that the first initial synchronization source and the second initial synchronization source are synchronized.

11. The method according to claim 1,
wherein the first initial synchronization source and the second initial synchronization source are devices of the device-to-device communication network.

12. The method according to claim 1,
wherein the first initial synchronization source and the second initial synchronization source are synchronization sources among radio base stations and a global navigation satellite system.

13. The method according to claim 1,
wherein the first synchronization signal is emitted by a first device and the second synchronization signal is emitted by a second device and further comprises,
if the first and second synchronization signals are non-aligned and the first initial synchronization source is synchronized with the second initial synchronization source,
transmitting to at least one device among the first device and the second device an information about a timing difference between the first and second synchronization and an information that the first and second initial synchronization source are synchronized.

14. The method according to claim 1, further comprising:
receiving a third synchronization signal and receiving a third information associated to a third initial synchronization source, such as the third synchronization signal is either an initial synchronization signal emitted by the third initial synchronization source or a synchronization signal emitted by another device which is synchronized based on the third initial synchronization sources,
wherein if the second initial synchronization source and third initial synchronization source are synchronized, transmitting to at least one other device the first and second information and:
an information about a timing difference between the first synchronization signal and the second synchronization signal,
 if power of the second synchronization signal is higher than power of the third synchronization signal, or
 if a beginning of a frame transmitting the second synchronization signal is received before a beginning of a frame transmitting the third synchronization signal; or
an information about a timing difference between the first synchronization signal and a computed synchronization signal, the computed synchronization signal being computed based on the second synchronization signal and according to an estimated propagation delay or a minimum propagation delay between the emitter of the second synchronization signal and the device.

15. The method according to claim 1, further comprises,
receiving several synchronization signals and receiving information associated to several corresponding initial synchronization sources, such as, each synchronization signal among the several synchronization signals is either an initial synchronization signal emitted by a corresponding initial synchronization source among the several corresponding initial synchronization sources or a synchronization signal emitted by another device which is synchronized based on the corresponding initial synchronization sources, the several corresponding initial synchronization sources being synchronized with the second initial synchronized source;
transmitting to at least one other device an information about a timing difference between the first synchronization signal and a combination of the second synchronization signal and the several synchronization signals and the first and second information.

16. A non-transitory computer-readable medium for storing a computer program product comprising code instructions to perform the method according to claim 1, when said instructions are run by a processor.

17. A device in a device-to-device communication system, said device comprising:
a processor; and
a non-transitory computer-readable medium comprising instructions stored thereon, which when executed by the processor configure the device to:
receive a first synchronization signal and receive a first information associated to a first initial synchronization source, such as the first synchronization signal is either an initial synchronization signal emitted by the first initial synchronization source or a synchronization signal emitted by another device which is synchronized based on the first initial synchronization sources;
receive a second synchronization signal and receive a second information associated to a second initial synchronization source, such as the second synchronization signal is either an initial synchronization signal emitted by the second initial synchronization source or a synchronization signal emitted by another device which is synchronized based on the second initial synchronization sources;
determine if the first initial synchronization source is synchronized with the second initial synchronization source based on the first and second information, the first information comprising an ID associated with the first initial synchronization source and the second information comprising an ID associated with the second initial synchronization source;

wherein, said second initial synchronization source being either the first initial synchronization source or another initial synchronization source than the first initial synchronization source;

wherein the initial synchronization signal emitted by a first respectively the second initial synchronization source does not depend on the reception by the first respectively the second initial synchronization source of another synchronization signal.

18. A device in a device-to-device communication system, said device comprising:

a processor; and a non-transitory computer-readable medium comprising instructions stored thereon, which when executed by the processor configure the device to:

receive a synchronization signal and receive an information associated to an initial synchronization source, such as the synchronization signal is either an initial synchronization signal emitted by the initial synchronization source or a synchronization signal emitted by one other device which is synchronized based on the initial synchronization sources;

emit a synchronization signal based on the received synchronization signal and emit information associated to the initial synchronization source;

wherein the information associated to the initial synchronization source enables a determination if the initial synchronization source is synchronized with another initial synchronization source when the information associated to the initial synchronization source is compared to an information associated to the other initial synchronization source, the information associated with the initial synchronization source comprises an ID associated with the initial synchronization source and the information associated with the other initial synchronization source comprises an ID associated with the other initial synchronization source.

19. A method implemented by a device-to-device communication system comprising: the device according to claim 18, a second device, a first initial synchronization source; and a second initial synchronization source, wherein the second device in a device-to-device communication system, said second device comprising:

a processor; and a non-transitory computer-readable medium comprising instructions stored thereon, which when executed by the processor configure the device to:

receive a synchronization signal and receive an information associated to an initial synchronization source, such as the synchronization signal is either an initial synchronization signal emitted by the initial synchronization source or a synchronization signal emitted by one other device which is synchronized based on the initial synchronization sources;

emit a synchronization signal based on the received synchronization signal and emit information associated to the initial synchronization source;

wherein the information associated to the initial synchronization source enables to determine if the initial synchronization source is synchronized with another initial synchronization source when the information associated to the initial synchronization source is compared to an information associated to the other initial synchronization source;

the method comprises:

the reception by the device according to claim 18 or the second device of a first synchronization signal and an information associated to the first initial synchronization source, such as the synchronization signal is either the first initial synchronization signal emitted by the initial synchronization source or a synchronization signal emitted by one other device which is synchronized based on the first initial synchronization sources;

the emission by the second device of a third synchronization signal based on the first synchronization signal and the emission of an information associated to the first initial synchronization source if the second device receives the synchronization signal;

the reception by the first according to claim 18 of the second synchronization signal and either the first and/or the third synchronization signal;

the transmission by the device according to claim 18 to a third device of the device-to-device system of an information about a timing difference between the second synchronization and one among the first and third synchronization signal and the first and second information.

* * * * *